(12) United States Patent
Savitzky et al.

(10) Patent No.: US 8,412,946 B2
(45) Date of Patent: *Apr. 2, 2013

(54) TRUSTWORTHY TIMESTAMPS AND CERTIFIABLE CLOCKS USING LOGS LINKED BY CRYPTOGRAPHIC HASHES

(75) Inventors: Stephen Savitzky, San Jose, CA (US); Kurt Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,766

(22) Filed: Jul. 29, 2011

(65) Prior Publication Data

US 2012/0017093 A1    Jan. 19, 2012

Related U.S. Application Data

(63) Continuation of application No. 11/677,458, filed on Feb. 21, 2007, now Pat. No. 8,006,094.

(51) Int. Cl.
*H04L 29/06* (2006.01)

(52) U.S. Cl. .................. 713/178; 713/176; 713/400

(58) Field of Classification Search .................. 713/178, 713/176, 400
See application file for complete search history.

(56) References Cited

U.S. PATENT DOCUMENTS

| | | | |
|---|---|---|---|
| 4,809,158 A | 2/1989 | McCauley | |
| 5,396,622 A | 3/1995 | Lee et al. | |
| 5,495,608 A | 2/1996 | Antoshenkov | |
| 5,500,897 A | 3/1996 | Hartman | |
| 5,592,618 A | 1/1997 | Micka et al. | |
| 5,613,113 A | 3/1997 | Goldring | |
| 5,708,780 A | 1/1998 | Levergood et al. | |
| 5,778,388 A | 7/1998 | Kawamura et al. | |
| 5,845,292 A | 12/1998 | Bohannon et al. | |
| 5,949,876 A | 9/1999 | Ginter et al. | |
| 5,956,404 A | 9/1999 | Schneier et al. | |
| 5,978,475 A | 11/1999 | Schneier et al. | |
| 6,009,530 A | 12/1999 | Goatly | |
| 6,044,381 A | 3/2000 | Boothby | |
| 6,065,018 A | 5/2000 | Beier et al. | |
| 6,125,368 A | 9/2000 | Bridge et al. | |
| 6,192,365 B1 | 2/2001 | Draper et al. | |
| 6,199,169 B1 | 3/2001 | Voth | |
| 6,236,988 B1 | 5/2001 | Aldred | |
| 6,289,356 B1 | 9/2001 | Hitz et al. | |
| 6,308,175 B1 | 10/2001 | Lang et al. | |

(Continued)

FOREIGN PATENT DOCUMENTS

| | | |
|---|---|---|
| EP | 0 443 972 | 8/1991 |
| EP | 1 594 252 | 11/2005 |

(Continued)

OTHER PUBLICATIONS

European Extended Search Report for corresponding European Patent Application No. 08250588.4, Jul. 6, 2011, 8 pgs.

(Continued)

*Primary Examiner* — Michael Pyzocha
(74) *Attorney, Agent, or Firm* — Blakely, Sokoloff, Taylor & Zafman LLP (57) ABSTRACT

A method and apparatus for creating and/or using trustworthy timestamps and certifiable clocks using logs linked by cryptographic hashes. In one embodiment, the method comprises maintaining a first, chained-hash log; associating a first clock with the chained-hash log, and entangling the first log; with a second by adding a time-stamped synchronization entry to the chained-hash log, where the synchronization entry has a second time indication associated with the second log and a hash of one or more entries in the first log.

17 Claims, 6 Drawing Sheets

U.S. PATENT DOCUMENTS

| | | |
|---|---|---|
| 6,341,316 B1 | 1/2002 | Kloba et al. |
| 6,345,288 B1 | 2/2002 | Reed et al. |
| 6,360,215 B1 | 3/2002 | Judd et al. |
| 6,363,363 B1 | 3/2002 | Haller et al. |
| 6,400,845 B1 | 6/2002 | Volino |
| 6,418,421 B1 | 7/2002 | Hurtado et al. |
| 6,463,427 B1 | 10/2002 | Wu |
| 6,499,665 B1 | 12/2002 | Meunier et al. |
| 6,522,770 B1 | 2/2003 | Seder et al. |
| 6,546,385 B1 | 4/2003 | Mao et al. |
| 6,552,770 B2 | 4/2003 | Yanagawa et al. |
| 6,557,004 B1 | 4/2003 | Ben-Shachar et al. |
| 6,574,627 B1 | 6/2003 | Bergadano et al. |
| 6,584,477 B1 | 6/2003 | Moser |
| 6,607,948 B1 | 8/2003 | Sugiyama et al. |
| 6,615,208 B1 | 9/2003 | Behrens et al. |
| 6,631,469 B1 | 10/2003 | Silvester |
| 6,640,301 B1 | 10/2003 | Ng |
| 6,661,933 B1 | 12/2003 | Hisatomi et al. |
| 6,687,696 B2 | 2/2004 | Hofmann et al. |
| 6,697,948 B1 | 2/2004 | Rabin et al. |
| 6,708,281 B1 | 3/2004 | Walsh |
| 6,771,885 B1 | 8/2004 | Agnihotri et al. |
| 6,807,632 B1 | 10/2004 | Carpentier et al. |
| 6,862,728 B2 | 3/2005 | Darnell et al. |
| 7,054,626 B2 | 5/2006 | Rossmann et al. |
| 7,079,750 B2 | 7/2006 | Nomura et al. |
| 7,203,796 B1 | 4/2007 | Muppalaneni et al. |
| 7,249,258 B2 | 7/2007 | Honda et al. |
| 7,278,115 B1 | 10/2007 | Conway et al. |
| 7,340,450 B2 | 3/2008 | Sugahara et al. |
| 7,401,225 B2 | 7/2008 | Tanimoto et al. |
| 7,406,487 B1 | 7/2008 | Gupta et al. |
| 7,412,371 B2 | 8/2008 | Fisher et al. |
| 7,454,521 B2 | 11/2008 | Howell et al. |
| 7,478,120 B1 | 1/2009 | Zhang |
| 7,555,196 B1 | 6/2009 | Crawford et al. |
| 7,574,605 B2 | 8/2009 | Tanimoto et al. |
| 7,590,985 B1 | 9/2009 | Nguyen |
| 7,806,342 B2 | 10/2010 | Lapstun et al. |
| 7,853,564 B2 | 12/2010 | Mierau et al. |
| 7,890,598 B2 | 2/2011 | Lakamp |
| 7,962,546 B2 | 6/2011 | Colon |
| 2002/0004800 A1 | 1/2002 | Kikuta et al. |
| 2002/0023221 A1 | 2/2002 | Miyazaki et al. |
| 2002/0046072 A1 | 4/2002 | Arai et al. |
| 2002/0055942 A1 | 5/2002 | Reynolds |
| 2002/0095454 A1 | 7/2002 | Reed et al. |
| 2002/0103848 A1 | 8/2002 | Giacomini et al. |
| 2002/0116379 A1 | 8/2002 | Lee et al. |
| 2002/0120484 A1 | 8/2002 | Bantz et al. |
| 2002/0122543 A1 | 9/2002 | Rowen |
| 2002/0126872 A1 | 9/2002 | Brunk et al. |
| 2002/0184180 A1 | 12/2002 | Debique et al. |
| 2003/0016980 A1 | 1/2003 | Meunier et al. |
| 2003/0021441 A1 | 1/2003 | Levy et al. |
| 2003/0021677 A1 | 1/2003 | Masutani |
| 2003/0046586 A1 | 3/2003 | Bheemarasetti et al. |
| 2003/0050863 A1 | 3/2003 | Radwin |
| 2003/0053655 A1 | 3/2003 | Barone et al. |
| 2003/0083040 A1 | 5/2003 | Ruth et al. |
| 2003/0088593 A1 | 5/2003 | Stickler |
| 2003/0123447 A1 | 7/2003 | Smith |
| 2003/0126148 A1 | 7/2003 | Gropper et al. |
| 2003/0126276 A1 | 7/2003 | Kime et al. |
| 2003/0131240 A1 | 7/2003 | Greene et al. |
| 2003/0145207 A1 | 7/2003 | Jakobsson et al. |
| 2003/0158944 A1 | 8/2003 | Branson et al. |
| 2003/0191764 A1 | 10/2003 | Richards |
| 2003/0212677 A1 | 11/2003 | Chen et al. |
| 2003/0236857 A1 | 12/2003 | Takase et al. |
| 2004/0030681 A1 | 2/2004 | Shannon et al. |
| 2004/0064693 A1 | 4/2004 | Pabla et al. |
| 2004/0064833 A1 | 4/2004 | Lee et al. |
| 2004/0068652 A1 | 4/2004 | Carpentier et al. |
| 2004/0075866 A1 | 4/2004 | Thormodsen et al. |
| 2004/0078337 A1 | 4/2004 | King et al. |
| 2004/0117627 A1 | 6/2004 | Brewington |
| 2004/0122741 A1 | 6/2004 | Sidman |
| 2004/0177067 A1 | 9/2004 | Takeda |
| 2004/0177281 A1 | 9/2004 | Balaz et al. |
| 2004/0220975 A1 | 11/2004 | Carpentier et al. |
| 2004/0225655 A1 | 11/2004 | Moulton |
| 2004/0244039 A1 | 12/2004 | Sugahara et al. |
| 2004/0260593 A1 | 12/2004 | Abraham-Fuchs et al. |
| 2005/0038756 A1 | 2/2005 | Nagel |
| 2005/0038809 A1 | 2/2005 | Abajian et al. |
| 2005/0055343 A1 | 3/2005 | Krishnamurthy |
| 2005/0071209 A1 | 3/2005 | Tatavu et al. |
| 2005/0089131 A1 | 4/2005 | Howell et al. |
| 2005/0091229 A1 | 4/2005 | Bali et al. |
| 2005/0114452 A1 | 5/2005 | Prakash |
| 2005/0114709 A1 | 5/2005 | Moore |
| 2005/0210059 A1 | 9/2005 | Albornoz et al. |
| 2005/0262243 A1 | 11/2005 | Ternasky et al. |
| 2005/0267885 A1 | 12/2005 | Klier |
| 2005/0289187 A1 | 12/2005 | Wong et al. |
| 2006/0010095 A1 | 1/2006 | Wolff et al. |
| 2006/0036579 A1 | 2/2006 | Byrd et al. |
| 2006/0047967 A1 | 3/2006 | Akhan et al. |
| 2006/0056653 A1 | 3/2006 | Kunisa |
| 2006/0093241 A1 | 5/2006 | Nakamura et al. |
| 2006/0101007 A1 | 5/2006 | Go |
| 2006/0129576 A1 | 6/2006 | Carpentier et al. |
| 2006/0136719 A1 | 6/2006 | Doyle et al. |
| 2006/0139622 A1 | 6/2006 | Mann |
| 2006/0149558 A1 | 7/2006 | Kahn et al. |
| 2006/0150079 A1 | 7/2006 | Albornoz et al. |
| 2006/0178954 A1 | 8/2006 | Thukral et al. |
| 2006/0195886 A1 | 8/2006 | Ashley |
| 2006/0218204 A1 | 9/2006 | Ofer et al. |
| 2006/0225073 A1 | 10/2006 | Akagawa et al. |
| 2006/0230081 A1 | 10/2006 | Craswell et al. |
| 2006/0253418 A1 | 11/2006 | Charnock et al. |
| 2006/0271787 A1 | 11/2006 | DeYoung et al. |
| 2007/0086061 A1 | 4/2007 | Robbins |
| 2007/0094467 A1 | 4/2007 | Yamasaki |
| 2007/0143356 A1 | 6/2007 | Kleinsmith et al. |
| 2007/0156777 A1 | 7/2007 | Wolff et al. |
| 2007/0170250 A1 | 7/2007 | Bystrom et al. |
| 2007/0185689 A1 | 8/2007 | Muraski et al. |
| 2007/0219942 A1 | 9/2007 | Wolff et al. |
| 2007/0244920 A1 | 10/2007 | Palliyil et al. |
| 2007/0283194 A1 | 12/2007 | Villella |
| 2008/0002243 A1 | 1/2008 | Cowburn |
| 2008/0019505 A1 | 1/2008 | Thomas |
| 2008/0059800 A1 | 3/2008 | Piersol |
| 2008/0071646 A1 | 3/2008 | Hodson et al. |
| 2008/0104407 A1 | 5/2008 | Horne et al. |
| 2008/0243688 A1 | 10/2008 | Hart et al. |
| 2008/0250100 A1 | 10/2008 | Hatanaka et al. |
| 2009/0089337 A1 | 4/2009 | Perlin et al. |
| 2009/0164506 A1 | 6/2009 | Barley et al. |
| 2009/0328218 A1 | 12/2009 | Tsurukawa |
| 2010/0011305 A1 | 1/2010 | Ullom et al. |

FOREIGN PATENT DOCUMENTS

| | | |
|---|---|---|
| EP | 1594252 | 11/2005 |
| EP | 1 622 074 | 2/2006 |
| EP | 1622074 A1 | 2/2008 |
| JP | 2000-013586 A | 1/2000 |
| JP | 2001092827 | 4/2001 |
| JP | 2002-254770 A | 9/2002 |
| JP | 2006086778 | 3/2006 |
| WO | 03/071394 A2 | 8/2003 |
| WO | WO 03071392 | 8/2003 |

OTHER PUBLICATIONS

Maniatis et al., "Secure History Preservation Through Timeline Entanglement", http://arxiv.org/PS_cache/cs/pdf/0202/0202005v1. pdf, Feb. 6, 2002, pp. 1-16.

Google Search, "creating hash values as identifiers", http://www.google.com/search?hl=en&rls=GGLD%2CGGLD%... h+values+as+identifiers&aq=f&aqi=oq=&gs_rfai=, Apr. 7, 2010, 2 pgs.

Lee, Jae Il et al., "A Model for Embedding and Authorizing Digital Signatures in Printed Documents", 2002, 14 pgs.

US Office Action for related U.S. Appl. No. 11/677,458, Nov. 22, 2010, 10 pgs.

US Office Action for related U.S. Appl. No. 11/677,458, Jul. 12, 2010, 11 pgs.

US Office Action for related U.S. Appl. No. 11/677,458, Apr. 16, 2010, 11 pgs.

Phan at al., "Challenge: Integrating Mobile Wireless Devices into the Computational Grid", MOBICOM '02, Sep. 22-28, 2002, pp. 271-278.

Hisashi et al., "Hysteresis Signature and its Related Technologies to Maintain the Digital Evidence for Network Activities in Future Society", Journal of the National Institute of Information and Communications Technology, 2005, pp. 191-201, vol. 5-Nos. 1/2.

"Microsoft Computer Dictionary Fifth Edition", 2002, 3pgs., Microsoft Pres, Redmond, Washington 98052-6399, USA.

"PC Computer Notes and Online Tutorials More DOS Commands . . . ", http://www.pocomputernotes.com/operating_systems/dos04.htm, 5 pgs.

Flickr, "Photo tags", http://web.archive.org/web/20040607054247/http://www.flickr.com/photos/tags/, Jun. 7, 2004, 1 pg.

Tkachenco, "Log file in XML format" http://www.tkachenco.com/blog/archives/000053.html, Jul. 22, 2003, 4 pgs.

Mills, "Network Time Protocol Version 4 Reference and Implementanon Guide", NTP Working Group Technical Report, Jun. 1, 2006, 90 pgs.

Mills, "The Autokey Security Architecture, Protocol and Algorithms", Network Working Group Technical Report Category: Eclectic, Jan. 1, 2006, 61 pgs.

Mills, "RCF 1305—Network Time Protocol (Version 3) Specification, Implementation and Analysis", Network Working Group) Request for Comments: 1305 Obsoletes RCF-1119, RCF-1059, RCF-956, Mar. 1992, 123 pgs.

Mills, "Simple Network Time Protocol (SNTP) Version 4 for IPv4, IPv6 and OSI", Network Working Group Request for Comments: 4330 Obsoletes 2030, 1769 Category: Informational, Jan. 2006, 31 pgs.

Chen, et al, "EFC—Event Correlation for Forensics," Internet Citation, [Online], Nov. 25, 2003, XP002441540, 10 pages.

"EP1804180 International Search Report," EP Appl No. 06027063.4-1527, Apr. 18, 2007, 6 pages.

European Patent Office (Registered Letter) with Partial European Search Report for EP 07 25 33 88, mailed Jan. 25, 2008, 5 pages.

European Search Report dated Oct. 31, 2008, for European Application No. 08153371.3, 7 pages.

European Search Report dated May 6, 2008, for European Application No. 07253388.8, 11 pages.

European Search Report dated Jul. 22, 2011, for European Patent Application No. 08153371.3, 5 pages.

European Search Report dated Aug. 11, 2008, for European Application No. 08153379.6-1225, 7 pages.

European Summons to Attend Oral Proceedings for related European Patent Application No. 05014793.3, Jun. 29, 2012, 11 pages.

European Summons to Attend Oral Proceedings Pursuant to Rule 115(1) EPC for related European Patent Application No. 06027063.4, May 20, 2011, 5 pages.

Japanese Office Action for Japanese Application No. 2007-224787, dated May 8, 2012, English Bibliographic data included, 5 pages.

Japanese Office Action for Japanese Patent Application No. 2005-198824, Mar. 8, 2011, 5 pages *No Translation Provided*.

Japanese Office Action for Japanese Patent Application No. 2007-224787, Sep. 4, 2012, 3 pages *No Translation Provided*.

Li, Tao, et al, "An Integrated Framework on Mining Logs Files for Computing System Management," Proceedings of the Eleventh ACM SIGKDD International Conference on Knowledge Discover in Data Mining, [Online], Aug. 21, 2005 (Aug. 21, 2008),-Aug. 24, 2005, pp. 776-781, XP002480863, Chicago, IL.

U.S. Final Office Action for U.S. Appl. No. 10/887,998, Sep. 15, 2010, 16 pages.

U.S. Final Office Action for U.S. Appl. No. 11/322,435, Sep. 11, 2008, 26 pages.

U.S. Final Office Action for U.S. Appl. No. 10/887,998, Jan. 8, 2008, 8 pages.

U.S. Final Office Action for U.S. Appl. No. 10/887,998, Nov. 17, 2009, 11 pages.

U.S. Final Office Action for U.S. Appl. No. 10/887,998, Dec. 22, 2008, 9 pages.

U.S. Final Office Action for U.S. Appl. No. 11/322,435, May 7, 2010, 28 pages.

U.S. Final Office Action for U.S. Appl. No. 11/322,435, Jun. 25, 2009, 27 pages.

U.S. Final Office Action for U.S. Appl. No. 11/692,784, Feb. 3, 2009, 16 pages.

U.S. Final Office Action for U.S. Appl. No. 11/692,784, dated Jun. 9, 2010, 19 pages.

U.S. Final Office Action for U.S. Appl. No. 11/804,435, Jun. 7, 2010, 11 pages.

U.S. Final Office Action for U.S. Appl. No. 11/804,635, Jan. 7, 2010, 9 pages.

U.S. Office Action for U.S. Appl. No. 10/887,998, Mar. 30, 2007, 5 pages.

U.S. Office Action for U.S. Appl. No. 10/887,998, Apr. 8, 2010, 11 pages.

U.S. Office Action for U.S. Appl. No. 10/887,998, May 11, 2009, 12 pages.

U.S. Office Action for U.S. Appl. No. 10/887,998, Jul. 12, 2007, 8 pages.

U.S. Office Action for U.S. Appl. No. 10/887,998, Jul. 28, 2008, 8 pages.

U.S. Office Action for U.S. Appl. No. 11/322,435, Jan. 30, 2009, 27 pages.

U.S. Office Action for U.S. Appl. No. 11/322,435, Jan. 4, 2010, 26 pages.

U.S. Office Action for U.S. Appl. No. 11/322,435, Feb. 15, 2008, 24 pages.

U.S. Office Action for U.S. Appl. No. 11/692,784, Apr. 13, 2011, 29 pages.

U.S. Office Action for U.S. Appl. No. 11/692,784, Jul. 22, 2009, 20 pages.

U.S. Office Action for U.S. Appl. No. 11/692,784, Aug. 5, 2008, 14 pages.

U.S. Office Action for U.S. Appl. No. 11/804,435, Oct. 4, 2010, 11 pages.

U.S. Office Action for U.S. Appl. No. 11/804,435, Dec. 30, 2009, 7 pages.

U.S. Office Action for U.S. Appl. No. 11/804,435, Jun. 11, 2012, 15 pages.

U.S. Office Action for U.S. Appl. No. 11/804,435, Jun. 18, 2009, 10 pages.

U.S. Office Action for U.S. Appl. No. 11/804,635 dated Apr. 27, 2011, 17 pages.

U.S. Office Action for U.S. Appl. No. 11/804,635, Jun. 22, 2009, 9 pages.

U.S. Office Action for U.S. Appl. No. 11/804,635, Jul. 22, 2010, 15 pages.

U.S. Office Action for U.S. Appl. No. 11/804,635, Aug. 24, 2012, 19 pages.

U.S. Appl. No. 11/322,435, Notice of Allowance mailed Aug. 26, 2010, 7 pages.

U.S. Appl. No. 11/323,542, Notice of Allowance mailed Feb. 18, 2011, 10 pages.

TRUSTWORTHY TIMESTAMPS AND CERTIFIABLE CLOCKS USING LOGS LINKED BY CRYPTOGRAPHIC HASHES

PRIORITY

The present patent application is a continuation of and incorporates by reference the corresponding patent application Ser. No. 11/677,458, titled, "Trustworthy Timestamps and Certifiable Clocks Using Logs Linked by Cryptographic Hashes," filed on Feb. 21, 2007 now U.S. Pat. No. 8,006,094.

RELATED APPLICATIONS

This application is related to the following applications, U.S. patent application Ser. No. 10/887,998, entitled Synchroninzing Distributed Work Through Document Logs, filed on Jul. 9, 2004; U.S. patent application Ser. No. 11/323,543, entitled Refining Based on Log Content, filed on Dec. 29, 2005; U.S. patent application Ser. No. 11/323,542, entitled Always On and Updated Operation for Document Logs, filed on Dec. 29, 2005; U.S. patent application Ser. No. 11/323,629, entitled Log Integrity Verification, filed on Dec. 29, 2005; and U.S. patent application Ser. No. 11/514,711, entitled Paper-Based Document Logging, filed on Aug. 31, 2006, assigned to the corporate assignee of the present invention.

FIELD OF THE INVENTION

The present invention is related to the field of document processing; more specifically, the present invention is related to entangled logs that are linked with hashes to provide trustworthy timestamps and certifiable clocks.

BACKGROUND OF THE INVENTION

Today, at times, there is a need to prove that a particular version of a document existed on or before a particular time. In the past, this was accomplished by using a time stamp. Individuals looking to determine when a document might have existed would base their determination on the timestamp itself. However, for the determination to be accurate, the timestamp would have to be trustworthy.

In any system that incorporates logs (including event logs, version control changelogs, and workflow document logs), it is sometimes essential to be able to prove that such-and-such a log entry was made at a particular time (for example to prove that a particular version of a document was seen by so-and-so no later than now and no earlier than then). In other words, unforgeable timestamps are needed.

The usual way of dealing with this problem is to have a centralized "digital notary" service that dispenses unforgeable timestamps, which can then be applied to documents or log entries. This is done by hashing the entry, sending the hash to the notary, and receiving a verifiable receipt that can later be used to prove that the hash of the entry was seen by the notary at a particular time. From time to time, the notary service publishes its current "running hash" in a print medium such as a newspaper of record. Alternatively, a trusted source may supply certified, tamper-proof clock devices that issue digitally-signed certificates. It is essential in both centralized approaches that a service or device maintains a hash-connected log that can be used retrospectively to prove that a document with a given hash existed at a particular time.

Peer-to-peer systems, decentralized version-control systems like "git" and other decentralized systems make centralized methods impossible. There are a number of reasons for this. Separate devices have their own clocks, which may be inaccurate, and keep their own logs. They may be out of contact with a network for extended periods of time, and may often be turned off.

Public key cryptography has been used as a solution in the past. In such a case, public keys are used to authenticate. This allows a user to trust a particular server. However, a decision as to which server to trust must be made ahead of time.

NTP (Network Time Protocol) is used to synchronize clocks on networked devices. NTP involves synchronization messages between servers and clients. NTP version 4 includes a distributed security architecture called the Autokey public-key authentication protocol that allows the provenance of timestamps to be traced back to trustworthy sources to establish a trusted provenance for timestamps. However, it only allows the NTP client to accurately determine the current time. This by itself does not allow the accuracy of an NTP-generated timestamp to be verified at a later date.

SUMMARY OF THE INVENTION

A method and apparatus for creating and/or using trustworthy timestamps and certifiable clocks using logs linked by cryptographic hashes. In one embodiment, the method comprises maintaining a first, chained-hash log; associating a first clock with the chained-hash log, and entangling the first log; with a second by adding a time-stamped synchronization entry to the chained-hash log, where the synchronization entry has a second time indication associated with the second log and a hash of one or more entries in the first log.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for providing trustworthy timestamps and certifiable clocks using logs linked by cryptographic hashes is described. In one embodiment, devices maintain a hash-connected time log and use it to timestamp (entangle) its other log entries. When two devices meet to exchange log information, they can synchronize their time logs. That is, each device makes a time-stamped log entry that contains the other log's time and log hash. This forms a "web of trust." Thus, by exchanging the running hash, the logs are entangled, thereby yielding a partial ordering on log entries (e.g., versions, events, etc.) that represents causal ordering. In one embodiment, the entangled log is used to prove, for example, which documents or events were seen by a given device at the time a particular log entry was made.

In one embodiment, each device places bounds on their clock's accuracy, depending on its assessment of the other device's accuracy, and this in turn bounds the accuracy of all their intervening timestamps. Some devices may have clocks synchronized to the GPS satellite system, an NTP tier-1 time server, or some other trustworthy source. In one embodiment, by tracing back from log entries with timestamps based on these trustworthy sources, absolute bounds are placed on the time of any logged event.

A device may have been disconnected or powered down for a period of time long enough to lose its clock. Even in this case, the bounds are computable, and the past history of a device can be used to further quantify the confidence that can be placed in its timestamps.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Log Overview

For purposes herein, a log is a sequence of timestamped "entries" in which each entry depends on the entire sequence of preceding entries. This is accomplished by my making each entry include a hash of the previous entry. The entries and their hashes form a chain, such that no entry can be changed without changing its hash and, by induction, the hashes of all subsequent entries. That is, every log has a "running hash" which, in one embodiment, is the hash of the most recent entry. Because the most recent entry includes the previous value of the running hash, it can be proved by induction that the current running hash is determined by the content and sequence of all previous entries. (Note that the hash of an entry may be used to uniquely identify the entry.)

In one embodiment, entries in the log relate to a document. For example, the log might represent the sequence of operations applied to a digital file, version history of a document, access of a document, or any other type of information that might be relevant for various applications. For purposes herein, the term "document" may include a text file, an audio file, GRS information, a telephone call log, etc. The operations may include an indication of when a document was printed, viewed, or other information was added to the document.

In one embodiment, both entries and documents can be stored as blobs (a "Binary Large Object" as known in database arts), each being an immutable data object identified by its cryptographic hash.

There are a number of operations that may be performed on or to a log or logs. These include, for example, but not limited to, the following:

1) adding an entry to a log;
2) entangling two logs by use of cross-referencing entries (if the logs are both time logs, i.e., logs that include timestamped entries) this is called a "synchronization event";
3) annotating an entry (by, for example, making a new entry that refers to the hash ID of the entry being annotated); and
4) annotating a range of entries to indicate revised timestamps that are asserted or determined to be more accurate.

These operations will be described in more detail below.

Log Format and Events

In one embodiment, the format of a log entry is implementation-specific. In one embodiment, the format is an XML entity. In another embodiment, the format is a MIME "message." In one embodiment, the log events have the following format:

logEvent(eventType,bodyText,attributes)

which makes a log entry with the given type and body text (free-form) and additional attributes (a list of attribute=value pairs).

In one embodiment, the event contains the following information in the form of name-value pairs (XML attributes or "Name: value" header items):
1) previous entry—the hash (and possibly the sequence number) of the previous log entry. In an alternative embodiment, the sequence number isn't included where it's always one less than the sequence number of the current entry.
2) sequence number—the sequence number of the current entry. The current time data, namely localTime, offset, driftRate, syncTime, syncEvent, may be included either in separate attributes, as a single timestamp string, or in some combination of both.
3) event type—the event type, as given in the logEvent operation.
4) body text—the "body", a freeform string. If the log entry is in the form of a MIME message, the Content-Size header is present, and the Content-Type header is optional.
5) references—any documents being timestamped, or previous log events being referred to, are referenced in attributes rather than in the body text.

There are a number of event types that may be used. In one embodiment, these are as follows:
1) record—record a (timestamped) comment in the body.
2) timestamp—timestamp a document. In one embodiment, the document is specified by its hash. If the blob is available and has a document log, it is annotated.
3) sync—synchronize to another time log server or NTP server. There may be several versions of this depending on which server is making the request and whether the server's clock is being adjusted. This event records both the current (old) time and the new, adjusted time.
4) unsync—indicates a loss of synchronization (e.g., due to power loss) and an inability to find a suitable time server.
5) correct—annotate timestamps in a range once the correct offset is known. In one embodiment, the range is typically between an unsync and a sync. With this event, the timestamped document blobs are annotated if they are accessible and have document logs.
6) request—documents a request made to another server.

Adding an Event to a Log

Figure 1:
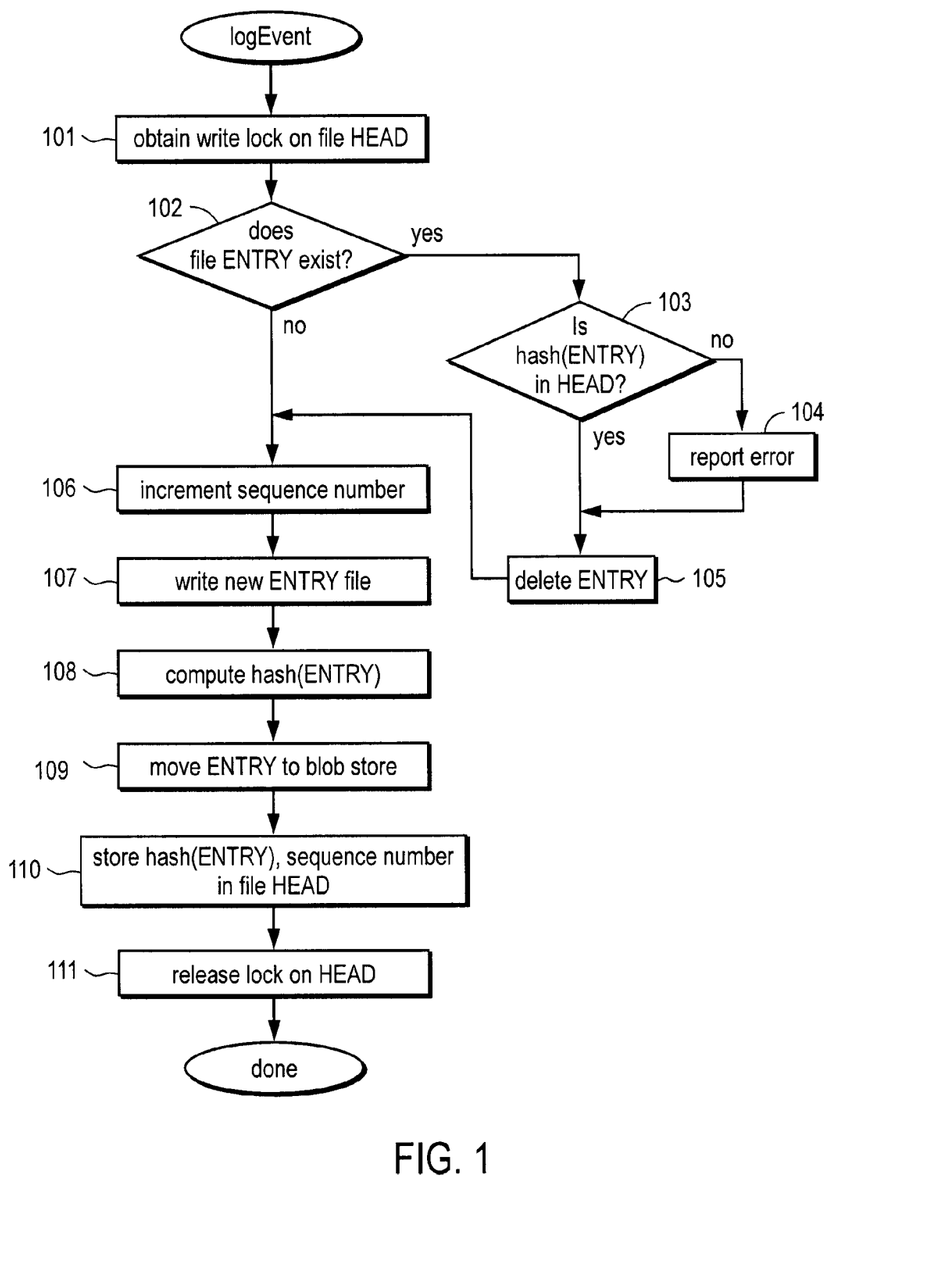
FIG. 1 a flow diagram of one embodiment of a method for logging an entry.

FIG. 1 is a flow diagram of one embodiment of a process for logging an event. The process is performed by processing logic that may comprise hardware (circuitry, dedicated logic, etc.), software (such as is run on a general purpose computer system or a dedicated machine), or a combination of both.

For purposes of illustrating the process, a log having a file name HEAD is used. In one embodiment, the log is maintained by a time log server. In one embodiment, the time log server is a CGI accessed through a web server. In such a case, clients and peers use GET requests to retrieve log entries by hash or by time interval and use POST requests to create entries.

Referring to FIG. 1, the process begins by processing logic obtaining a write lock on the file HEAD (processing block 101) to prevent the file HEAD from being accessed while an event is being added to the log. This is optional. In one embodiment, the HEAD contains the file path (including a sequence number and hash) of the most recent entry.

More specifically, locking prevents the processing of two POST requests from overlapping. This may be done in a single-threaded web server or one that can guarantee single-threaded access to a resource. On the other hand, a multi-threaded server like Apache requires either file locking or a separate, single-threaded co-server. In one embodiment, a system call to get an exclusive lock on the file that points to the most recent log entry (e.g., contains the most recent entry). A Java mini-server that does its own internal locking, or a Perl CGI may be used.

Next, processing logic tests whether the file ENTRY exists (processing block 102). If the file ENTRY does not exist in the file HEAD, processing logic transitions to processing block 106. If file ENTRY does exist in the file HEAD, processing logic verifies its sequence number and hash match the file HEAD by transitioning to processing block 103 where processing logic tests whether the hash of the entry, referred to as hash(ENTRY), is in the file HEAD. If it is not, processing logic reports an error to the party attempting to add the event to the log (processing block 104) and transitions to processing block 105. If the hash of the entry (hash(ENTRY)) is in the file HEAD, processing logic transitions to processing block 105 where ENTRY is deleted from the file HEAD and processing logic transitions to processing block 106.

At processing block 106, processing logic increments the sequence number to point to the next entry in the log. Thereafter, processing logic constructs a new ENTRY file containing the new entry (including the sequence number) (processing block 107) and computes the hash of ENTRY by applying a hash to ENTRY (processing block 108). After computing the hash of the entry, processing logic computes its new path and moves ENTRY to the blob store (processing block 109) and stores hash (ENTRY) and the sequence number in the file HEAD (processing block 110). Afterwards, processing logic releases the lock on the file HEAD (processing block 111) and the process ends.

Resynchronizing a Log

In one embodiment, a log undergoes a synchronization event in which a different clock, or time, is used to synchronize entries in a log. When the new time is derived from another log, and the time of the current log is being used for synchronizing the other log, the cross-referencing entries causes the two logs to become entangled.

Figure 2:
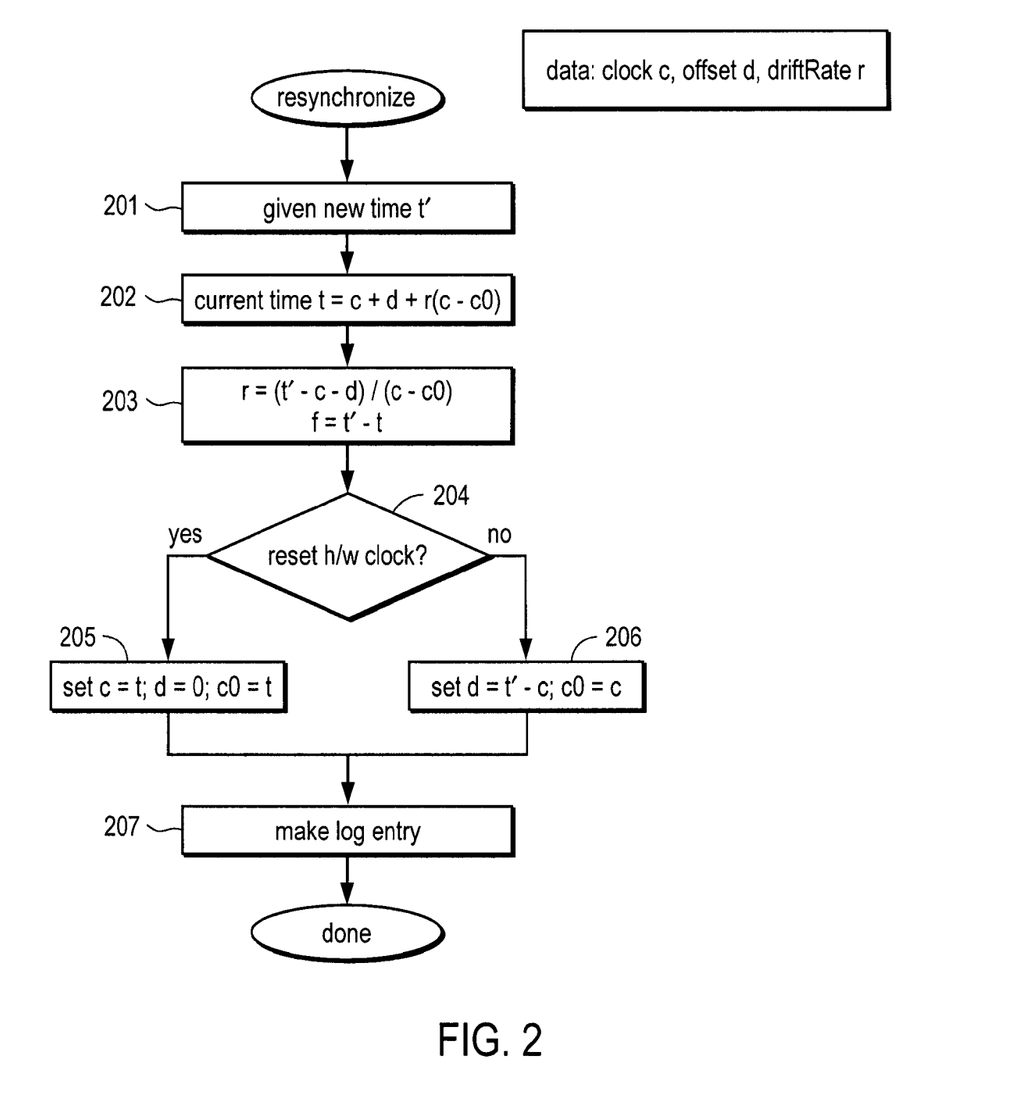
FIG. 2 a flow diagram of one embodiment of a method for resynchronizing log entries in a log.

FIG. 2 illustrates a flow diagram of one embodiment of a process for resynchronizing a log using a clock or time, from another source (e.g., another log, a trustworthy source, etc.). The process is performed by processing logic that may comprise hardware (circuitry, dedicated logic, etc.), software (such as is run on a general purpose computer system or a dedicated machine), or a combination of both.

In one embodiment, the following time data parameters are used in the process:
1) long clockTime (c, clock)—the time currently indicated by the hardware clock or the device maintaining the log.
2) long offset (d, delta)—represents the difference between "real" time and local time of the log as of the last synchronization. In one embodiment, d is set such that d=0 if the hardware clock is reset to "real" time as part of the synchronization process.
3) double driftRate (r, rate)—the rate at which local time used by the log diverges from real time. This is first derivative of the clock frequency with respect to time.
4) long baseTime (c0)—represents the clockTime as of the most recent synchronization event.
5) long fixup (f)—represents the fixup to be applied to resynchronized events.

Figure 3:
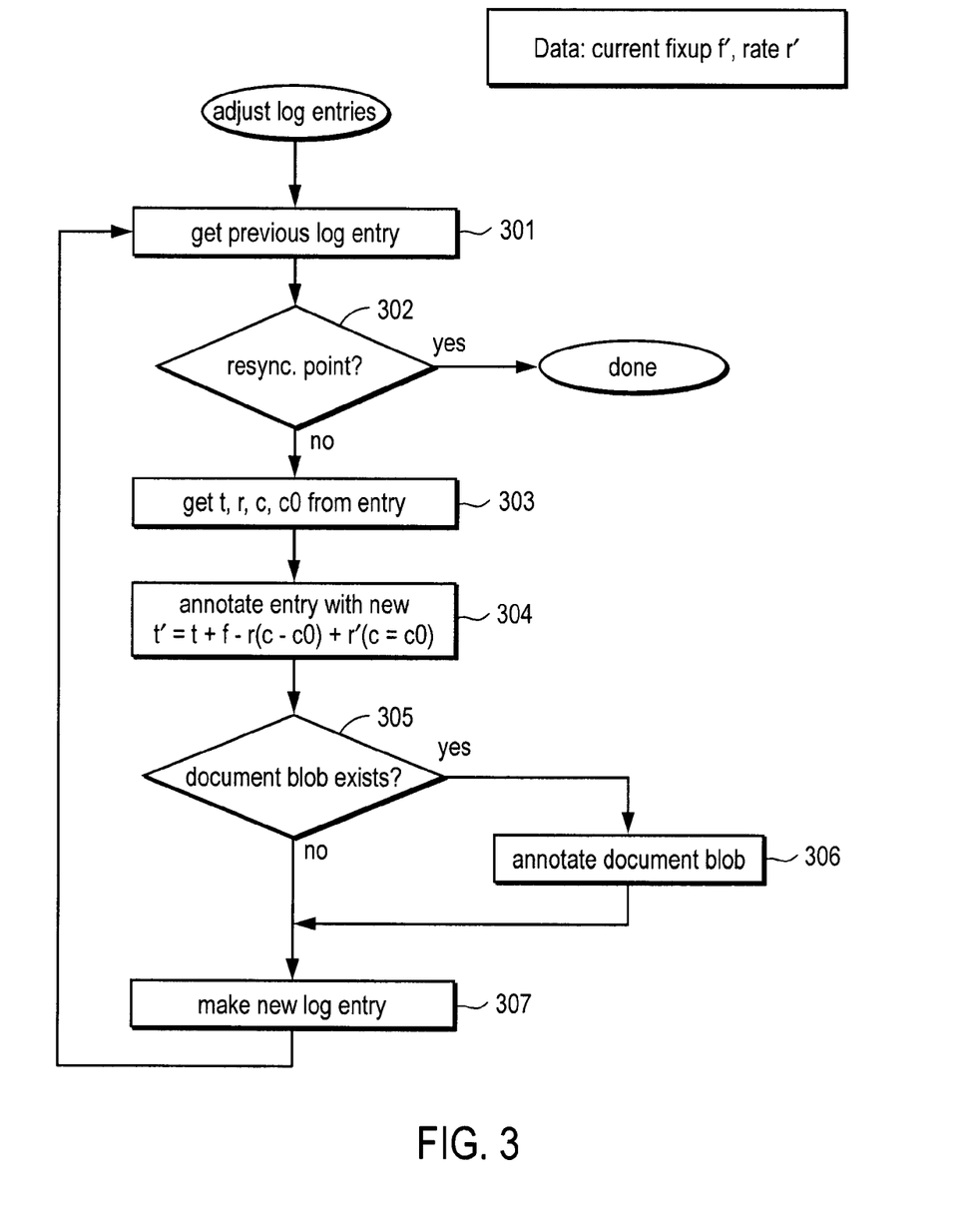
FIG. 3 a flow diagram of one embodiment of a method for adjusting log entries.

Referring to FIG. 3, the process begins by processing logic obtaining a new time t' (processing block 201). The new time may be obtained from a trustworthy source (e.g., another log, a real time clock source, etc.).

Next, processing logic sets the current time t based on the clock c, an offset d, and the drift rate r over a period of time. Using the time data, in one embodiment, the system determines the current "real" time (t) according to the following:

realTime=clockTime+offset+driftRate*(localTime−syncTime), which may be represented by:

$$t=c+d+r(c-c0)$$

(processing block 202).

Then, processing logic sets the drift rate r and long fixup f according to the following equations:

$$r=(t'-c-t)/(c-c0)$$

$$f=t'-t$$

(processing block 303).

At this point, in one embodiment, the hardware clock can be reset to the correct value. Next, processing logic tests whether the hardware clock is to be reset (processing block 204).

In another embodiment, the offset can be adjusted to make the effective time correct. In one embodiment, which of these embodiments to use is a system configuration decision that depends upon many factors, including, for example, the requirements of other applications that may be affected by changes to the hardware clock.

In one embodiment, the hardware clock is not changed; alternatively, the hardware clock is reset to the new time t1.

If the hardware clock is to be reset, processing logic transitions to processing block 205 where the clock c is set equal to the current time t, the offset d is set equal to zero, and c0 is set equal to the current time t, and then the process transitions to processing block 207. If the hardware clock has not been reset, processing logic sets the offset d equal to t'−c and sets c0 equal to c (processing block 206) and then the process transitions to processing block 207. Thus, when performing resynchronization, given an accurate time t' at local clock time c, new parameters c0, c, d, and ' are computed, and these become the new values of c0, d, and r.

At processing block 207, processing logic makes the log entry.

Thereafter, the process is done.

Synchronization may also be performed after a period of running unsynchronized. In this case, the best that can be done to set r'=r, since there is no accurate value for c0 available that would allow it to be recomputed. The parameter c0 is the clock time at which we started running unsynchronized.

To correct a previous timestamp t (with original parameters c, d, c0 and r) given a new, presumably more accurate, rate r', and a current fixup f, the old rate correction is subtracted out and the new one is substituted in. This is represented using the following:

$$t'=t+f-r(c-c0)+r'(c-c0)$$

In one embodiment, if the system clock is kept synchronized using NTP, and is being constantly adjusted in a phase-locked loop such that r=0 on average, resynchronization will rarely, if ever, be necessary except after a period of running unsynchronized, and correction will consist applying a constant fixup.

Annotating Log Entries

In one embodiment, log entries may be annotated with a revised time. This may be performed when a more trustworthy clock (i.e., a clock from a more trustworthy source) becomes available. In such a case, one or more entries in the log may be resynchronized to the more trustworthy clock.

FIG. 3 is a flow diagram of one embodiment of a process for annotating one or more log entries. The process is performed by processing logic that may comprise hardware (circuitry, dedicated logic, etc.), software (such as is run on a general purpose computer system or a dedicated machine), or a combination of both.

Referring to FIG. 3, the process begins by processing logic obtaining a previous log entry (processing block 301). After obtaining the previous log entry, processing logic tests whether the location of this entry in the log is at the resynchronization point (processing block 302). If it is, the resynchronization process has been completed.

If the location of this entry in the log is not at the resynchronization point, the processing logic obtains the time of the entry (t), the drift rate (r), the clock (c), and the starting time (c0) from the entry (processing block 203) and annotates the entry with a new time t' determined according to the following:

$$t'=t+f-r(c-c0)+r'(c-c0)$$

(processing block 304).

Then, processing logic determines whether the document blob exists (processing block 305). If it does, processing logic annotates the document blob to indicate the revised time t' (processing block 306) and transitions to processing block 307. If the document blob does not exist, processing block transitions directly to processing block 307. At processing block 307, processing logic makes a new log entry into the log indicating that a correction has been made. Afterwards, processing logic transitions to processing block 301 where the process repeats.

Note that, in one embodiment, annotation is done in a way that preserves the original document and log-entry blobs, since their hashes (and hence, their identities) are essential to the integrity of the time logs.

In one embodiment, a hash-connected log of annotations is kept in a directory named by appending ".log" to the hash of the original document or log entry being annotated.

Trustworthy Timestamps

Generic Timestamps

In one embodiment, a time log server produces trustworthy timestamps. In one embodiment, the time log server may be prompted to produce a trustworthy timestamp by having a request containing the hash of the item (e.g., a document blob, directory-tree blob, or hash-based revision identifier) to be time-stamped sent to the time log server. The request comes from a requesting entity (e.g., a requesting program). The time log server makes an entry in its time log containing the hash and the time, and returns the hash of the entry to the requesting entity.

In one embodiment, a time log server, at a minimum, accepts a block of text and posts it to the log with a timestamp and the hash of the previous entry. In one embodiment, the time log server detects skew between the current time according to the hardware clock and the most recent entry, as well as being able to perform some operations for resynchronizing.

In one embodiment, the time is also returned. Note that this is not required since that can be retrieved from the log entry using its hash, but it will usually be convenient to return the time anyway to save effort on the part of the requesting entity. One way to make use of the resulting timestamp is to make a log entry or some other piece of metadata associated with the object being time-stamped. This works especially well if the time log and the application are keeping logs in the same format.

Entangled Logs

In one embodiment, trustworthy timestamps are provided by a device (e.g., a time log server) that logs event times and document (blob) hashes using a hash-chained log, and that entangles its log entries with those of other devices. The more entangled its log is with those of other clocks, the more difficult it becomes to tamper with the clock or to create log entries. The entangled logs establish a "web of trust" similar to the web of trust employed in cryptographic systems like PGP.

Referring back to FIG. 1, the entry to be added may be a time-stamped log entry that is to be added into an event log that already contains one or more time-stamped entries. As discussed above, in one embodiment, the time-stamped entries are added as part of the synchronization process (e.g., synchronization entries). By adding these synchronization entries, the event logs are cross-connected or entangled.

In one embodiment, the document timestamps are traceable to trusted authorities using the cross-connected event logs cross-connected through synchronization entries added as part of synchronizing.

Bounding by Tracing Log Entanglements

By tracing log entanglements back to a trustworthy clock with a known relationship to a well-known time standard (e.g., established by a cryptographically-authenticated protocol such as, for example, NTP), it becomes possible to place several kinds of bounds on a clock. These include absolute bounds and approximate bounds. With absolute bounds, it is possible to determine, at the time of entanglement, the absolute range of possible clock skew based on the timestamps associated with the entanglement. With approximate bounds, between entanglements, the offset and drift rate of the clock can be computed. This can be used to compute timestamps that can be guaranteed as long as the clock has not been tampered with. This is described in more detail in the flow charts discussed below.

Figure 4:
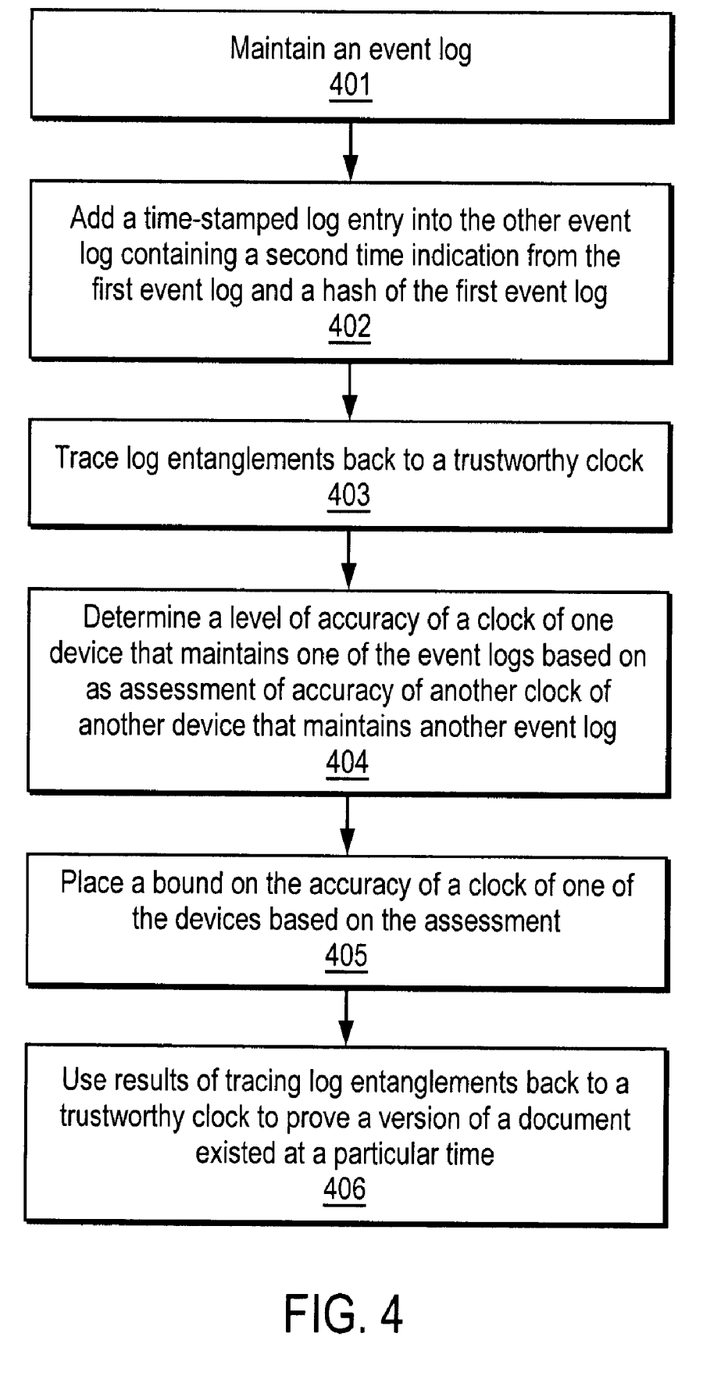
FIG. 4 is a flow diagram of one embodiment of a method for processing logs.

FIG. 4 is a flow diagram of another embodiment of a method for processing logs. The process is performed by processing logic that may comprise hardware (circuitry, dedicated logic, etc.), software (such as is run on a general purpose computer system or a dedicated machine), or a combination of both.

Referring to FIG. 4, the process begins by maintaining an event log (processing block 401). At some point, processing logic synchronizes the event log with another event log by adding a time-stamped log entry into the first event log containing a first time indication (e.g., a clock) from the other event log and a hash of the second event log. This represents the running hash of the other log.

To entangle two or more logs together, processing logic also adds a time-stamped log entry into the other event log containing a time indication of the clock associated with the first event log and a hash of the first event log (processing block 402). After performing this operation, each of the event logs comprises a hash-connected chain of entries. The hash-connected chain of entries comprises one or more event times and document hashes.

Next, processing logic traces log entanglements back to a trustworthy clock (processing block 403). In one embodiment, the trustworthy clock has a known relationship to a well-known time standard. In one embodiment, tracing log entanglements back to the trustworthy clock includes determining the reliability of timestamps based on observed clock accuracy and the reputation of a device that maintains another event log.

After tracing log entanglements back to the trustworthy clock, processing logic determines a level of accuracy of a clock of one device that maintains one of the event logs based on an assessment of accuracy of another clock of another device that maintains another event log (processing block 404) and places a bound on the accuracy of a clock of one of the devices based on the assessment (processing block 405). Accuracy of a clock may be assessed in a number of ways. For example, suppose that a time log has been synchronized at time t1, with another log, the time of which was known to be accurate within $\pm a1$. Suppose further that the log has been synchronized at time t2 with an accuracy of $\pm a2$. Then, it can be proven that every entry in the log with time $t1 \leq t < t2$ must have occurred in the interval $(t1-a1) < t < (t2+a2)$. In most cases, this guarantee of accuracy will be sufficient, e.g., for proving the priority of a patent on the date on which a payment was made. If it is further assumed that the clock has not been tampered with, then the bounds on time t can be narrowed to $(t-a1) < t < (t+a2)$. In one embodiment, this enables producing document timestamps with provable error bounds using cross-connected event logs.

In one embodiment, placing a bound on the accuracy of the clock includes determining a measure of clock drift and estimating an offset between the clock being used to time stamp entries in a log and another, more accurate clock (being synched to) using synchronization points resulting from synchronizing the event logs.

Optionally, processing logic may also use results of tracing log entanglements back to a trustworthy clock to prove a version of a document existed at a particular identified time (processing block 406). In one embodiment, the particular time comprises a time on or before a particular date.

In one embodiment, after a clock of a device maintaining an event log has been resynchronized by an entanglement with a more trustworthy clock, entries in the log are annotated with a more-accurate time. When this is done, new entry is put in the log indicating the range of entries that has been annotated.

Figure 5:
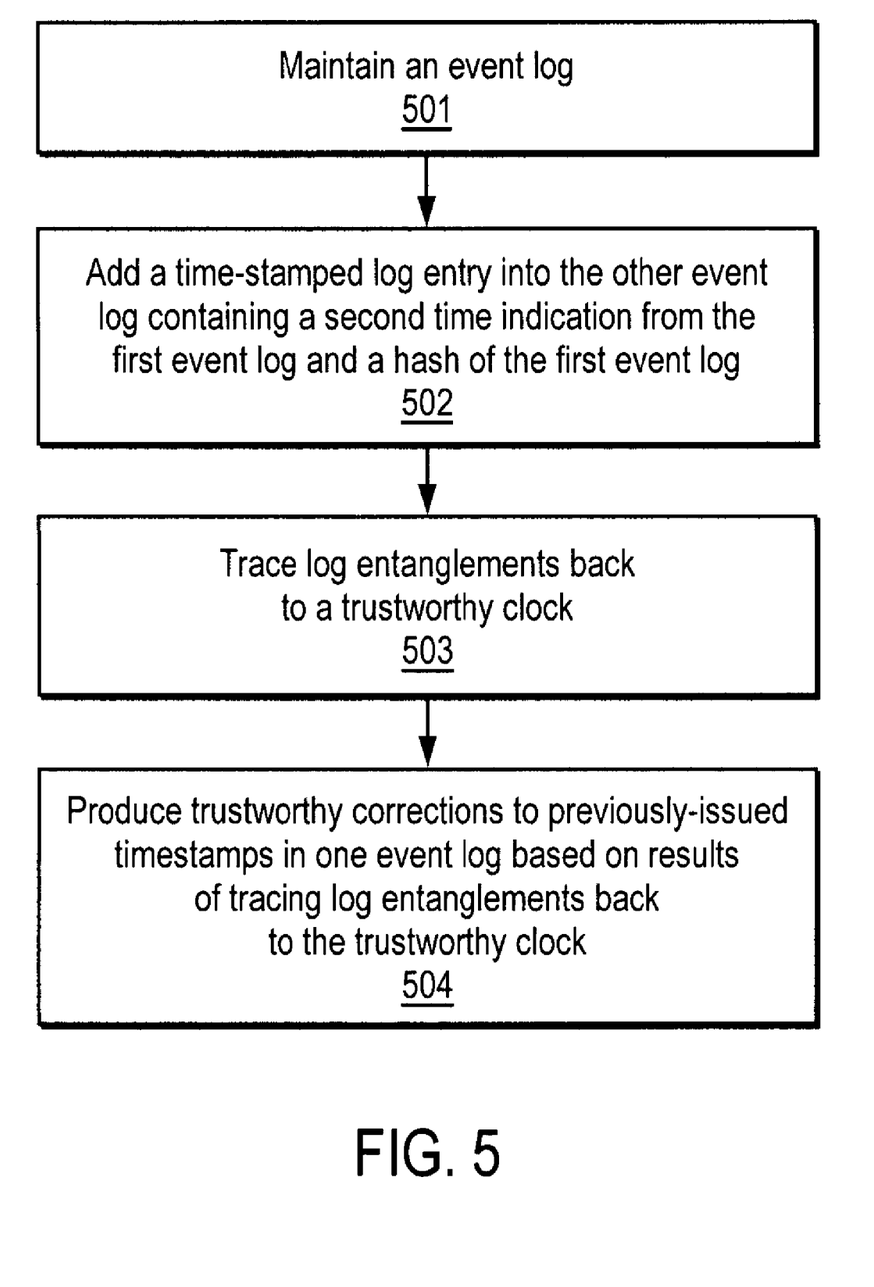
FIG. 5 is a flow diagram of another embodiment of a method for processing logs.

FIG. 5 is a flow diagram of another embodiment of a method for processing logs. The process is performed by processing logic that may comprise hardware (circuitry, dedicated logic, etc.), software (such as is run on a general purpose computer system or a dedicated machine), or a combination of both.

Referring to FIG. 5, the process begins by maintaining an event log (processing block 501). At some point, processing logic synchronizes the event log with another event log by adding a time-stamped log entry into the first event log containing a first time indication (e.g., a clock) from the other event log and a hash of the second event log.

To entangle two or more logs together, processing logic also adds a time-stamped log entry into the other event log containing a second time indication from the first event log and a hash of the first event log (processing block 502). It should be noted that the logs are entangled when only one of the two logs contains a cross-reference. If an entry is added to the second log, it is merely a convenient way to find the first log, and is in fact completely optional. After performing this operation, each of the event logs comprises a hash-connected chain of entries. The hash-connected chain of entries comprises one or more event times and document hashes.

Next, processing logic traces log entanglements back to a trustworthy clock (processing block 503). In one embodiment, the trustworthy clock has a known relationship to a well-known time standard.

After tracing log entanglements back to a trustworthy clock, processing logic produces trustworthy corrections to previously-issued timestamps in one event log based on results of tracing log entanglements back to the trustworthy clock (processing block 504). The corrections are then added to the log. These may be added as connotations to each entry that indicate that entry's error and/or its correction.

Time-Stamped Server Log Files

Web servers and other programs produce log files that contain timestamps. It may, in some cases, be valuable to be able to prove approximately when a certain logged event occurred. In one embodiment, this information is used to prove that there has been no tampering with the log file. In the case of a web server, this may be performed without having to modify the server, by using read access to the server's request log.

In one embodiment, the following sequence is performed. First, the time log server makes a request to the web server using a Universal Resource Identifier (URI) (e.g., a URL) that contains its current running hash, while recording the same hash in its own log. In one embodiment, this is performed using a HTTP GET request with the hash in a query string. Second, the time log server then reads the web server's log, computing a hash up to and including its own request (which is recognizable because it contains the first instance of the running hash). Third, the time log server then makes and records, in its own log, a second request that contains the (new) current running hash and the newly-computed hash of the server's log.

Note that this process is initiated by the time log server or an external client, not the web server, which is essentially a client of the time log server and does not need to be modified in any way. In one embodiment, the process is simplified because the web server knows about the time log server and its protocols. In this case, the following sequence is performed. First, the web server computes a running hash of its log, and puts it into its log in a recognizable form. Second, the web server sends this computed running hash to the time log server, which enters it in its own log, and sends the entry back to the web server to insert in its log. In one embodiment, with a web server, the entry is sent back using a GET request, as in third operation described above in the previous process. This works best, of course, if the web server is a time log server.

Additional Implementation Details

File and Directory Formats

In one embodiment, the following directory format is used:

yyyy/mmdd/hhmm/ss.fraction-hash

In an alternative embodiment, the following directory format is used:

/iii/jjj-hash

The letter format has the advantage that the sequence numbers increase monotonically regardless of adjustments to the clock.

In one embodiment, the entries are limited to 1000 per subdirectory (000-999), and levels are added as needed. Each entry contains a timestamp, the current offset, and its sequence number. As an added refinement, in one embodiment, old directories are aggregated into files (e.g., zip files) though concatenations, thereby making it easier to check for hash consistency.

In either case, a hash table may be used to map hashes into sequence numbers, and at least a list of major events (e.g., resynchonization, restarts, and daily checkpoints). Being able to checkpoint the hash table allows it to be rebuilt it when needed.

Application Style

The application style may be CGI, Command line or a Server. In one embodiment, the CGI application is implemented in Perl. A simple command-line application, possibly done in conjunction with the CGI, may be used, and is well adapted for cron jobs, makefiles (for example, to log when a release is made), and similar shell-level functions. A server application style is better for access. In such a case, the server can maintain a database and can serialize access to the log. On the negative side, using a server may be less reliable unless care is taken to make the server robust in the face of crashes and power failures.

Relationship to NTP

In one embodiment, the time log system is used to prove, after the fact, that NTP-tracable timestamps were used to generate the timestamp for a particular document. This provides a much-needed trustworthy linkage between NTP time and the timestamps on documents.

An Example of a Computer System

Figure 6:
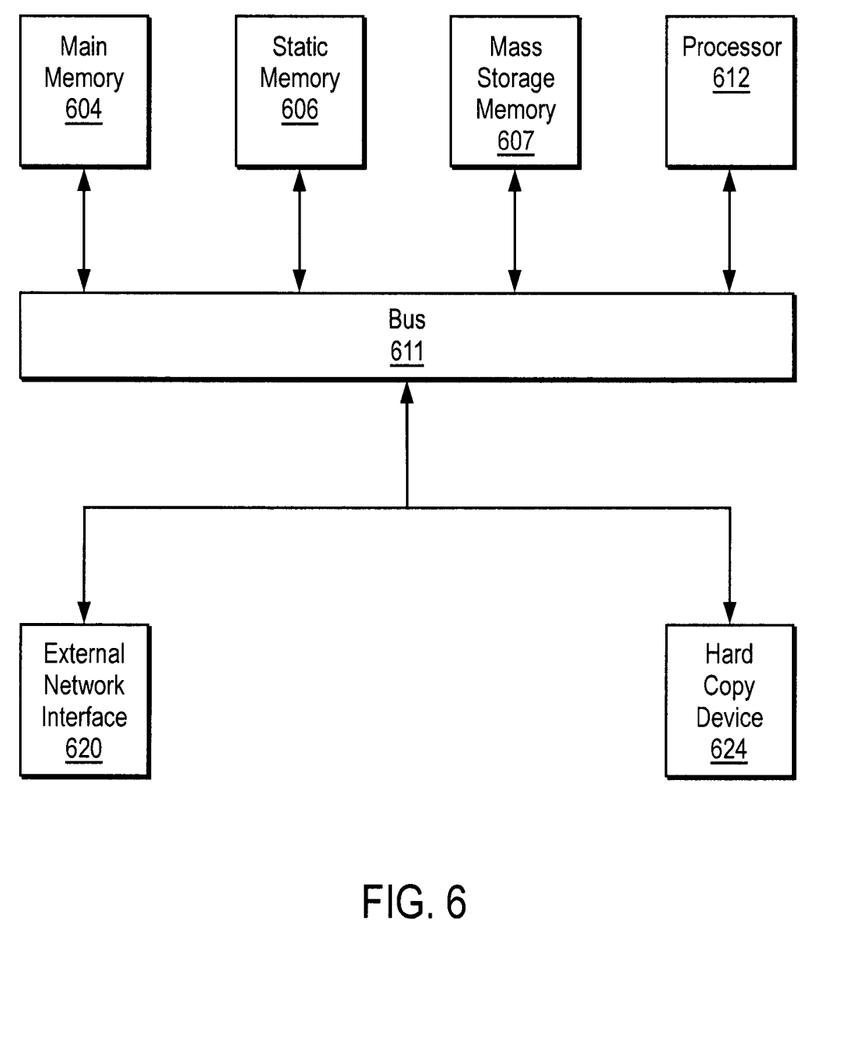
FIG. 6 is a block diagram of one embodiment of a computer system.

FIG. 6 is a block diagram of an exemplary computer system that may perform one or more of the operations described herein. Referring to FIG. 6, the computer system may comprise an exemplary client or server computer system, such as an embedded server. The computer system comprises a communication mechanism or bus 611 for communicating information, and a processor 612 coupled with bus 611 for processing information. Processor 612 includes a microprocessor, but is not limited to a microprocessor, such as, for example, Pentium, PowerPC, etc.

The computer system further comprises a random access memory (RAM), or other dynamic storage device 604 (referred to as main memory) coupled to bus 611 for storing information and instructions to be executed by processor 612. Main memory 604 also may be used for storing temporary variables or other intermediate information during execution of instructions by processor 612.

The computer system also comprises a read only memory (ROM) and/or other static storage device 606 coupled to bus 611 for storing static information and instructions for processor 612, and a data storage device 607, such as a magnetic disk or optical disk and its corresponding disk drive. Data storage device 607 is coupled to bus 611 for storing information and instructions.

Another device that may be coupled to bus 611 is hard copy device 624, which may be used for printing instructions, data, or other information on a medium such as paper, film, or similar types of media. Furthermore, a sound recording and playback device, such as a speaker and/or microphone may optionally be coupled to bus 611 for audio interfacing with the computer system. Another device that may be coupled to bus 611 is a wired/wireless communication capability 625 to communication to a phone or handheld palm device.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method, comprising:
maintaining, by a device that logs event times and document hashes, a first event log that is associated with a first clock;
entangling the first event log with a second event log maintained by another device;
tracing the entangling of the first event log with the second event log; and
annotating an entry in the first event log with a correction to a previously-issued timestamp in the entry based on results of tracing the entanglement, wherein an annotation of the entry in the first log is a new log entry in the first log that comprises a hash and a timestamp of the entry being annotated.

2. The method of claim 1, wherein the annotated entry is added to the first log as a connotation to a corrected entry in the first event log and indicates the corrected entry's error and a corresponding correction.

3. The method of claim 1, wherein entangling the first event log with a second event log and tracing the entangling further comprises:
adding a time-stamped synchronization entry to the first log, the time-stamped synchronization entry having a time indication from a second clock of the another device that is associated with the second event log; and
tracing the entangling of the first event log back to the second clock, wherein the second clock is trustworthy.

4. The method of claim 1, further comprising:
adding a time-stamped log entry from the first event log into the second event log, the time-stamped log entry containing a second time-stamped synchronization entry and a hash of the first event log.

5. The method of claim 1, further comprising:
determining a level of accuracy of the second clock based on an assessment of accuracy of the trustworthy clock; and
determining reliability of timestamps in time-stamped log entries in the first event log based on observed accuracy of the trustworthy clock and a reputation of the another device that maintains the trustworthy clock.

6. The method of claim 5, wherein the another device is a network time protocol (NTP) server.

7. The method of claim 5, wherein the another device is a global positioning system (GPS) device.

8. The method of claim 1, wherein the second clock that is trustworthy has a known relationship to a trusted time standard.

9. A non-transitory computer readable storage medium including instructions that, when executed by a processor, cause the processor to perform a method comprising:
maintaining, by a device that logs event times and document hashes, a first event log that is associated with a first clock;
entangling the first event log with a second event log maintained by another device;
tracing the entangling of the first event log with the second event log; and
annotating an entry in the first event log with a correction to a previously-issued timestamp in the entry based on results of tracing the entanglement, wherein an annotation of the entry in the first log is a new log entry in the first log that comprises a hash and a timestamp of the entry being annotated.

10. The non-transitory computer readable storage medium of claim 9, wherein the annotated entry is added to the first log as a connotation to a corrected entry in the first event log and indicates the corrected entry's error and a corresponding correction.

11. The non-transitory computer readable storage medium of claim 9, wherein entangling the first event log with a second event log and tracing the entangling further comprises:
adding a time-stamped synchronization entry to the first log, the time-stamped synchronization entry having a time indication from a second clock of the another device that is associated with the second event log; and
tracing the entangling of the first event log back to the second clock, wherein the second clock is trustworthy.

12. The non-transitory computer readable storage medium of claim 9, further comprising:
adding a time-stamped log entry from the first event log into the second event log, the time-stamped log entry containing a second time-stamped synchronization entry and a hash of the first event log.

13. The non-transitory computer readable storage medium of claim 9, further comprising:
determining a level of accuracy of the second clock based on an assessment of accuracy of the trustworthy clock; and
determining reliability of timestamps in time-stamped log entries in the first event log based on observed accuracy of the trustworthy clock and a reputation of the another device that maintains the trustworthy clock.

14. The non-transitory computer readable storage medium of claim 13, wherein the another device is a network time protocol (NTP) server.

15. The non-transitory computer readable storage medium of claim 13, wherein the another device is a global positioning system (GPS) device.

16. The non-transitory computer readable storage medium of claim 9, wherein the second clock that is trustworthy has a known relationship to a trusted time standard.

17. A system comprising:
a memory to store a first event log with log entries that comprise event times and document hashes; and
a processor to
maintain the first event log that is associated with a first clock,
entangle the first event log with a second event log maintained by another device,
trace the entangling of the first event log with the second event log, and
annotate an entry in the first event log with a correction to a previously-issued timestamp in the entry based on results of tracing the entanglement, wherein an annotation of the entry in the first log is a new log entry in the first log that comprises a hash and a timestamp of the entry being annotated.

* * * * *